W. R. CENTER.
Seed Planter.

No. 30,799.

Patented Dec. 4, 1860.

Witnesses
J.W. Coombs
R.S. Spencer

Inventor.
W.R. Center
per Munn & Co
attys.

UNITED STATES PATENT OFFICE.

W. R. CENTER, OF ATHENS, ILLINOIS.

CORN-PLANTER.

Specification of Letters Patent No. 30,799, dated December 4, 1860.

*To all whom it may concern:*

Be it known that I, W. R. CENTER, of Athens, in the county of Menard and State of Illinois, have invented a new and Improved Corn-Planter; and I do hereby declare that the following is a full, clear, and exact description thereof, reference being had to the accompanying drawings, making part of this specification, in which—

Figure 1:
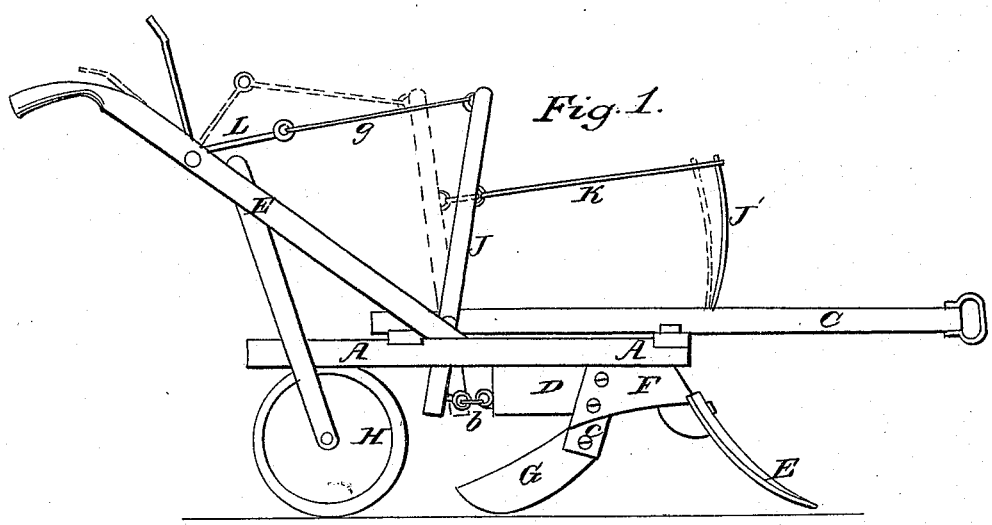
Figure 2:
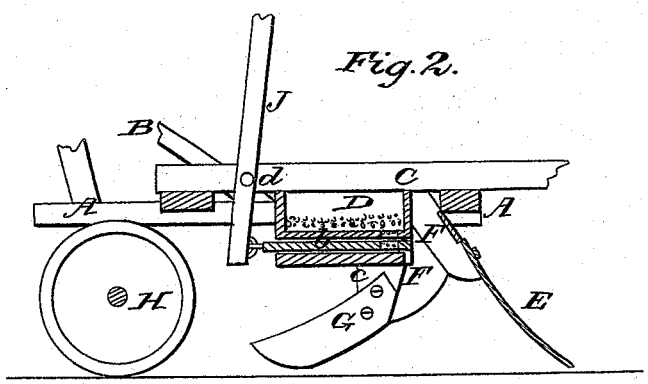

Figure 1 is a side elevation of the improved corn planter. Fig. 2 is a longitudinal middle section taken vertically through Fig. 1.

Similar letters of reference indicate corresponding parts in both figures.

To enable those skilled in the art to fully understand my invention I will proceed to describe its construction and operation.

In the drawings A is a quadrangular frame with two plow handles B, B, and a draft pole C projecting out over the frame A, with a clevis $a$ on its end.

D is the seed hopper, with an ordinary seed dropping slide, $b$, that has a reciprocating motion, in front of which hopper is placed a tooth E that opens the earth in drills for receiving the seed.

F is a guard projecting down around the front part of the seed dropping device behind the tooth E, which prevents the loosened earth from falling back into the drill.

G G are curved wings that are attached to arms $c$, $c$ and bent toward each other in such a manner that they act as coverers, for covering earth over the seed dropped into the drill. In rear of these coverers is placed a wheel H with a wide tread, upon which the back of the machine rests, said wheel acts as a roller to succeed the dropping and covering and press the earth down on the seed.

Attached to the rear end of the seed slide $b$ is a lever J which stands upright and has its fulcrum at $d$ on the draft pole C. This lever is acted upon by a spring J' and rod K and keeps the slide $b$ in the position indicated by Figs. 1 and 2 in black lines.

L is a bent lever pivoted to one of the plow handles which connects with the top of lever J by a rod $g$. Now by operating the bent lever L with the hand while the machine is being drawn forward the dropping of corn will take place at the pleasure of the driver.

It will be seen that by making the frame A wider and using double plows and scrapers, &c., that two rows of corn may be planted at one time.

Having thus described my invention, what I claim as new and desire to secure by Letters Patent is—

The arrangement of the guard F, coverers G plow E and roller H with the seed box D, slide $b$, beam A lever J, spring J' rods K, $g$, bent lever L and handles B all as herein shown and described for the purposes set forth.

W. R. CENTER.

Witnesses:
JACOB WILLIAMS,
I. R. OVERSTREET.